March 25, 1941.   H. W. RICHTER   2,236,354

MOLDED SHOE HEEL AND METHOD OF MAKING SAME

Filed Dec. 7, 1936

INVENTOR.
HERMAN W. RICHTER
BY
Caesar and Rivise
ATTORNEYS

Patented Mar. 25, 1941

2,236,354

UNITED STATES PATENT OFFICE 2,236,354

MOLDED SHOE HEEL AND METHOD OF MAKING SAME

Herman William Richter, Bridgewater, Mass.

Application December 7, 1936, Serial No. 114,670

16 Claims. (Cl. 12—147)

This application is a continuation in part of application Serial No. 638,603 filed October 19, 1932.

The present invention relates to the manufacture of indurated molded compositions and articles.

An important object of the invention is to produce a composition which is characterized by low cost of ingredients and manufacture, lightness of weight, attractiveness of appearance, mechanical strength, durability, toughness, resiliency, resistance to moisture and heat as well as to the ordinary chemical agents, unusually small shrinkage on drying, exceptional resistance to splitting and splintering, and retentiveness of nails, screws and other securing devices and the fact that it can readily be molded and can be worked in much the same general manner as rubber, horn, bone, wood, artificial plastics, etc. and which by reason of this unusual combination of qualities is eminently suited for the manufacture and fabrication of shoe heels.

Another object is to provide an article of indurated molded composition, particularly a shoe heel, of a more uniform and generally satisfactory quality.

Another object is to provide an article of indurated molded composition, particularly a shoe heel, having a resiliency approaching that of a similar article made of leather.

A further object is to provide a method for the manufacture and fabrication of indurated molded articles, particularly shoe heels, whereby the manifold details of manufacture characteristic of heel manufacture at the present stage of development of the art may be eliminated and the cost of labor and materials considerably reduced.

Still another object is to provide a method for the manufacture and fabrication of shoe heels which is not only more expeditious than prior art methods but is also capable of being practiced on a modern scale of mass production and lends itself admirably to chemical and technical control.

The invention will be described and in its specific aspects will be claimed with particular reference to the manufacture and fabrication of shoe heels, for not only is this one of the most promising applications of the invention, but it also lends itself admirably for the specific disclosure of the invention such as is called for by the patent statutes. Hence, although the invention will be described with considerable detail and particularity and certain specific terms and language will be utilized, it is to be understood that the present disclosure is illustrative, rather than restrictive and that no limitations are to be imported which are not required by the language of the claims and the state of the prior art.

Shoe heels as now manufactured may be divided into two general classes; namely, built-up heels of leather or leatherboard and the so-called wood heels. The so-called rubber heel has been omitted from this classification, for the term is in a sense a misnomer as the article which it purports to denote is ordinarily only a top-lift of rubber used in conjunction with a heel of leather, leatherboard or wood. Leather or leatherboard heels have a field peculiarly their own, as they have greater resiliency than heels of wood and a characteristic appearance much desired for certain purposes. The wood heel is today by far the more important of the two main classes because it may be covered with leather cut from the same hide or "fabric" from which the "upper" is fashioned or with composition materials designed to match the "upper." It may also be lacquered for use in cheap shoes or slippers. The built-up leather heel is not adapted because of its greater cost and other considerations to such use; hence it is used only where its unique properties render it more desirable.

The wood heel of commerce is preferably fashioned from hard maple, but the rapidly dwindling supply of suitable material has resulted in the increasing substitution of other woods, notably birch. Great care must be exercised in both the selection and curing of heel stock as defects and shrinkage cracks are disastrous both in the fabrication of the heels and in their subsequent use in shoemaking. Furthermore, several handlings are necessary in the fabrication of a wood heel and considerable hazards attend each of the handlings and manipulations, particularly the various turning operations. It is not surprising, therefore, that spoilage during manufacture and rejection by shoe manufacturers run into large figures. The covering of wood heels involves considerable more or less skilled hand labor, all of which is lost when a heel splits during the subsequent operation in which it is nailed to the shoe. These considerations make it evident that the material of the present invention is peculiarly well adapted by virtue of its unusual combination of properties to supplant wood in the fabrication of heels and hence presents a means for the elimination of the manifold details now so characteristic of heel manufacture and for the production of a more uniform and generally satisfactory article.

In one of its several aspects, the invention consists in selecting a suitable fibrous material of vegetable and/or non-vegetable origin, subjecting it to a preliminary treatment to increase its moldability and after the usual molding and drying steps treating the molded article with a material or admixture of materials adapted to impart to the article the desired characteristics such as have been previously set forth.

In another of its aspects, the invention consists in molding an article such as a shoe heel from a composition comprising a suitable fibrous material of vegetable and/or non-vegetable origin and then impregnating certain portions of the article to a suitable depth with a material or admixture of materials adapted to impart the necessary hardness, rigidity, resistance to moisture and nail-retentiveness to the article.

In another of its aspects, the invention consists in providing an article such as a shoe heel molded from a composition comprising a suitable fibrous material of vegetable and/or non-vegetable origin and treated with a material or admixture of materials which impart to the article the desired characteristics such as have been previously set forth.

In still another of its aspects, the invention consists in providing an article such as a shoe heel molded from a composition comprising a suitable fibrous material of vegetable and/or non-vegetable origin, and impregnated to a suitable depth with a material or admixture of materials which impart to the article the necessary properties for its intended purpose.

In certain of its aspects, the invention is partly based upon the discovery or observation that papermaking principles may be utilized not only in the selection of a stock for the preparation of a molding composition but also in the processing of the stock.

The foregoing discovery renders it possible to employ a wide range of fibrous materials of vegetable or non-vegetable origin in practicing the teachings of the present invention. This fact is exceedingly important when it is considered that hundreds of different fibrous materials are available to the papermaker and that new materials are constantly being rendered available. Among these materials may be mentioned those derived from seed hairs such as cotton; stem or bast fibers such as flax, jute and straw; leaf fibers such as manila hemp and sisal; and wood fibers such as those obtained from various trees including the coniferous or resinous trees such as the cypress and the spruce and the broadleaf or non-resinous (deciduous) trees such as the birch and poplar. Papers and boards are even made from leather fiber, as in leatherboard; from asbestos, as in asbestos paper and millboard; and from wool.

The foregoing discovery also makes it possible to render suitable for the purposes of the present invention many fibrous materials which would otherwise be wholly unsuitable.

The foregoing discovery also renders it possible to ascertain by means of relatively simple tests whether a given fibrous material is suitable for the purposes of the present invention, and if it is not suitable whether it can be made suitable.

Referring now briefly to the accompanying drawing.

Figure 1:
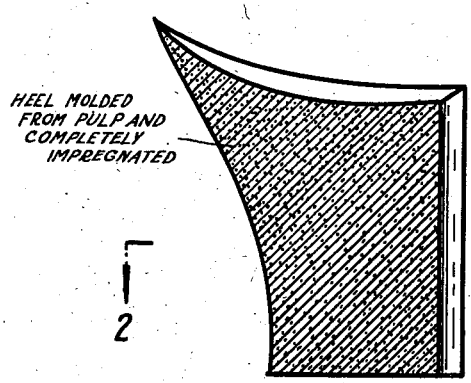
Figure 1 is a longitudinal vertical cross-section through a shoe heel made according to the teachings of the present invention, the indurating composition being shown as impregnating the entire heel.

In carrying out the method of the present invention, the first step consists in selecting a suitable stock for the preparation of a molding composition.

Generally speaking, I have found it possible to utilize a wide range of fibrous materials of vegetable or non-vegetable origin. It is my belief and it has thus far been my experience, that best results are obtained when, as raw materials, pulps of relatively long fiber are employed. There are various ways of ascertaining the fiber length of a given material. One method consists in actually measuring or calculating the length of the fibers in a suitable stained representative sample under a microscope. Another method consists in passing the material through a series of successively finer screens and ascertaining the percentage of fibers caught by each of the screens. The latter method is known as the selective screening or fractionation test.

Hereafter when the term "pulp of relatively long fiber" is used in the specification and claims, it is to be understood as meaning a pulp which when classified as to the particle size of its fibers has a high proportion of long fibers as opposed to short fibers or "fines." The term "pulp of relatively short fiber" is to be understood in the opposite sense to the foregoing definition. For the purpose of providing standards of comparison, reference is hereby made to pulps derived from the coniferous or resinous trees which are generally considered by the papermaker as having a relatively long fiber, and to pulps derived from the broadleaf or non-resinous trees which are generally considered as having a relatively short fiber.

The chief objection to short-fibered pulps is that, as a general rule, they shrink greatly on drying, causing deformation of the molded object and rendering it unsuitable for commercial use. A further objection to short-fibered pulps is that they produce heels which are very dense and hence more resistant to penetration by the indurating compositions which I use in a subsequent stage of my process. This makes that operation more time-consuming and costly.

It must not be thought from the foregoing statement that I cannot utilize fibrous materials which are generally considered as having a short fiber. They may be used to some extent as modifiers without materially impairing the desirable characteristics of the final product. Then again, many of the materials which are said to be short fibered contain a substantial though minor proportion of long fibers. Among such materials may be mentioned straw and the pulps obtained from the non-resinous or broadleaf trees. By passing such materials through suitable screens the fines and a substantial proportion of the objectionable short fibers may be readily removed, thus converting a short-fibered material into a long-fibered material and making it available for the purposes of the present invention.

Both "easy beating" and "hard beating" pulps may be employed as raw materials. These terms are to be understood as generally used in the art; i. e. an "easy beating" pulp is one that can be readily fibrillated or "hydrated" in a beater or similar instrumentality, while a "hard beating" pulp is one that is fibrillated or "hydrated" with considerable difficulty. As standards of comparison, reference is hereby made to "hard beating" pulps such as those derived from coniferous or resinous woods and from rope stock (manila hemp), and to "easy beating" pulps such as certain of the alpha cellulose pulps which are referred to in the art as the "easy beating alphas."

Excellent results have been obtained with pulps having the characteristics previously described and having the additional characteristic of being relatively "free." As is understood in the papermaking art, a "free" pulp is one which parts with its water rapidly when poured onto a screen. Pulps which are very "slow" appear to have the same objections as have already been pointed out in connection with short-fibered pulps. It should be noted at this point that the relative "freeness" or "slowness" of a pulp can be measured in various ways, as by means of the Schopper-Riegler "freeness" tester and the Brown sedimentation type of "slowness" tester. It should also be noted that generally speaking a "slow" pulp can be rendered relatively "free" by boiling or by means of alkaline lixiviation. Hence, an otherwise suitable pulp which appears to be "too slow" to produce a satisfactory molded article can in many instances be rendered wholly suitable for the purposes of the present invention. More will be said on the question of "slowness" and "freeness" in connection with subsequent operations.

By way of example of suitable pulps having the general characteristics of long fiber, high initial "freeness" and "hard beating" which I have used in making the molded article of the present invention, I may mention the pulps obtained from coniferous wood by either the sulphite or sulphate process. As a specific example of such pulps I may mention a long fibered spruce sulphite pulp. I have also obtained satisfactory results by using rope stock made from manila hemp which has the same general characteristics.

By way of example of long-fibered, "easy beating" pulps which are suitable for the purposes of the present invention, I may mention the "easy beating alphas" and the "easy beating" sulphites.

Before proceeding to the disclosure of the subsequent operations, it should be noted that the fibrous materials which may be used in practicing the present invention vary quite widely in their physical and chemical properties and respond somewhat differently to treatment. It follows therefore that the treatment which would most successfully and economically produce a molded article varies with the nature and specific characteristics of the stock. In order that a person skilled in the art may be able to readily determine the precise treatment to produce a molded article such as a shoe heel from a particular stock, I propose to set out the underlying principles together with a few specific examples illustrating their application.

The second step of the process consists in preparing the stock for molding. The purpose of this step is to defiberize the material and in the case of certain of the stocks to develop therein a self-adhesiveness sufficient to produce in the molded article a strong fiber-to-fiber bond.

The stock preparation may be carried out in a beater or hollander of conventional type. Other types of defiberizing equipment such as attrition mills, rod mills etc. may be used for this purpose, as my invention is in no wise limited to the use of any particular form of beating or refining apparatus.

The degree of beating or refining to which the stock is to be subjected depends in large measure upon the nature and characteristics of the stock. It should also be noted that stock preparation ties in very closely with subsequent operations such as molding and impregnating. Hence, in the following discussion as to stock preparation there will of necessity be several references to molding and impregnating.

Beating or refining serves to defiberize the stock. If it is carried beyond this stage, the stock gradually developes a self-adhesiveness and progressively becomes "slower" and "slower." The development of self-adhesiveness in the stock is very desirable, as it serves to produce in the molded product a strong fiber-to-fiber bond and effectively binds the fibers together. The refining of the pulp also results in better formation of the molded article, so that the unimpregnated "heel blank" is of exceptional strength and the impregnated heel shows excellent "nail retention," i. e. it grips and holds very satisfactorily nails that have been driven into it. A large number of observations clearly indicate that nail retention is definitely a function of the "slowness" of the prepared pulp, increasing with increasing "slowness." However, as has been pointed out, very "slow" stocks shrink on drying and produce dense heels which are more resistant to penetration by the indurating composition. Furthermore, an increase in "slowness" results in increased molding pressures, greater mold wear, increased extrusion of pulp where mold clearances exist, and a longer time for effecting compression. However, I have found it possible to minimize the foregoing drawbacks and to strike a satisfactory balance between the various variables by careful control as by means of "freeness" measurements and determinations of drainage rate.

In utilizing "freeness" measurements as a means of control, it must be borne in mind that the critical limits depend upon the particular stock. A few simple tests are sufficient to determine these limits in the case of a given stock. In the case of the spruce sulphite pulp previously referred to as a specific example of a suitable pulp, I have found that it should not have a "slowness" in excess of 7 minutes on the Brown sedimentation type tester scale, or a "freeness" less than 740 on the Schopper-Riegler scale. Highly satisfactory heels have been produced with a Brown "slowness" of 4 minutes and 29 seconds or a corresponding Schopper-Riegler value of 770.

I have found it possible to raise the "slowness" limit by incorporating with the beaten stock an infusible pore forming material such as charcoal, infusorial earth (celite) or powdered asbestos. Thus, in the case of the spruce sulphite pulp above referred to, I have succeeded in raising the "slowness" limit to 8 minutes and 55 seconds on the Brown scale by incorporating into the beaten pulp charcoal which will pass through a 90 mesh screen. I used about 5 grams of charcoal to every 400 grams of pulp, said pulp having a consistency of 5%, but it is to be understood that I am not to be limited to these proportions.

If the stock is of a "slowness" close to the upper limit, the pulp is merely defibered. If this is done in a beater or hollander of conventional type, the roll should be raised from the bedplate to avoid cutting or brushing the fiber.

If the stock has a "slowness" which is considerably lower than the upper limit, I may merely defiber it as in the case above referred to, but I prefer to beat the stock sufficiently to develop a self-adhesiveness in the pulp. It is not necessary to beat the stock beyond the point at which this self-adhesiveness is developed, but in some cases it is advantageous to beat the pulp until its "slowness" approaches the upper limit, provided the upper limit is not exceeded. For, as has been pointed out an increase in "slowness" improves certain of the properties of the molded article.

The stock is then diluted to desired consistency or concentration and is pumped to a chest of suitable capacity where it is maintained in a homogeneous condition by a stirring mechanism of suitable construction. From this reservoir the stock requirements of the heel-molding presses are supplied.

Molding is the next step. The molding should be carried out from relatively dilute suspensions of pulp due to the tendency of pulp suspensions to "clot" or form aggregates when in high concentration. I have observed that the tendency to "clot" can be appreciably reduced by the addition of what I choose to term "fiber lubricants." Suitable fiber lubricants are sulphur, rosin, naphthalene and the chlorinated naphthalene products known to the trade as "Halowax." The lubricants in finely divided form may be added to the furnish at any stage prior to the actual molding, e. g. in the beater or stuff chest. I have found that the presence of certain fiber lubricants such as sulphur seems to impair the speed of penetration by the indurating agent which I use in a later stage of the process and for that reason I prefer to use them in as small amounts as possible and carry out the molding operation at a consistency of 5% or less. It is not necessary to add alum or other agent to precipitate the lubricant on the pulp fiber. Fiber lubricants need not be used when charcoal or other infusible pore forming materials are added to the beaten pulp. These materials not only dispense with the necessity of using fiber lubricants but also facilitate penetration by the indurating composition.

For molding shoe heels I may advantageously use the form of mold disclosed in my prior applications Serial Nos. 638,603 and 727,544, filed October 17, 1932 and May 25, 1934 respectively. The molding may be carried out at ordinary temperatures or at raised temperatures. Heating of the stock to 70° C. or higher appears to be particularly advantageous in the case of relatively "slow" stocks.

After the article is removed from the mold, it is dried in any suitable or desired manner. This part of the process is very simple and lends itself readily to the use of modern handling methods as represented by conveyers, etc. The temperature of drying should not be much above 110° C. in order to avoid charring. Free circulation of air during this step greatly facilitates the drying and makes it possible to cut down the drying time for heels of average size to four hours.

The dried articles are then treated with suitable materials or admixture of materials to impart the necessary degree of rigidity and water resistance to the heel. Among the various indurating agents which I may use may be mentioned sulphur, rosin, pitches and synthetic resins of the Cumar and Vinsol types. These materials may be used either alone or in admixture in suitable proportions.

Impregnation with sulphur alone may be utilized for many articles in which extreme hardness is a desirable characteristic, but it is not entirely satisfactory for shoe heels as it renders them too hard to be nailed conveniently. However, impregnation with sulphur alone may be resorted to in the case of heels which are to be attached to shoes by means of an adhesive instead of nails. By the addition of various proportions of suitable modifying agents to the sulphur indurating bath both the hardness and nail-holding ability of the article may be modified to any desired degree. Indurating baths of fifty per cent sulphur and fifty per cent Halowax #1001 or seventy-five per cent sulphur and twenty-five per cent Halowax have been found to work well in practice. Several per cent of either the sulphur or of the Halowax may be replaced with rosin.

In the case of shoe heels impregnation may be either complete or partial. Generally speaking, complete impregnation contributes no advantage that partial impregnation cannot give. It is only necessary that the top of the heel, into which the nails attaching the heel to the shoe are to be driven, be impregnated to the depth of the nail; and that the bottom to which a rubber or leather "toplift" is applied, be correspondingly treated; and that the sides of the heel be impregnated only to such depth as will provide the necessary rigidity and waterproofness to the structure. These conditions are readily met by first submerging the heels to the required depth of penetration with reference to the tops, leaving them the requisite length of time, repeating the operation for the bottoms, and then submerging the entire heel for a much briefer period for the impregnation of the sides.

The rate of penetration varies with the density of the article and the viscosity of the indurating bath. Generally speaking, baths of pure sulphur penetrate less rapidly than the modified baths of lower viscosity. In one experiment, using a 50-50 sulphur-Halowax bath, twenty-five minutes sufficed for the impregnation of the heel top, fifteen minutes for the bottom, and five minutes for the sides. The indurating step also lends itself to modern methods; thus, the heels may be passed on a conveyor through the bath with their bottoms submerged only to the depths of one-half inch or so, then turned upside down by suitable mechanical means to impregnate the tops and finally submerged entirely for a brief period to permit a more or less skin-deep impregnation of the side walls.

After the heel has been removed from the indurating bath, it is allowed to cool. During the cooling step the solidification of the indurating compound knits the structure into a hard mass of high mechanical strength and imparts thereto other desired characteristics. It is now only necessary to remove the "mold fin" by the usual sanding operation and the heel is ready to be covered or lacquered in the same manner as a wood heel and attached to a shoe by means of the same machinery used in the case of a wood heel.

Figure 2:
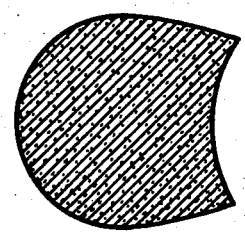
Figure 2 is a horizontal section taken substantially on line 2—2 of Figure 1.

In Figures 1 and 2 is illustrated a shoe heel molded from the composition of the present invention and completely impregnated.

Figure 3:
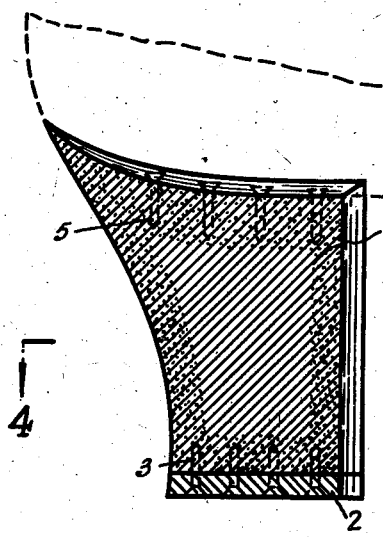
Figure 3 is a longitudinal vertical cross-section through another shoe heel made according to the teachings of the invention, the heel being shown provided with a top lift and attached to a shoe, and the indurating agent being shown as superficially impregnating the heel.
Figure 4:
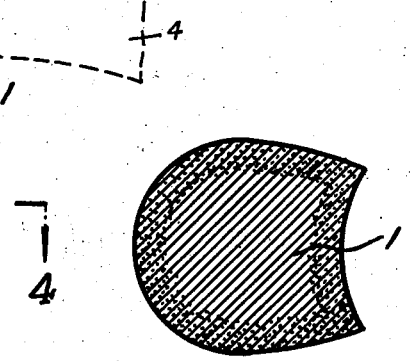
Figure 4 is a horizontal section taken substantially on line 4—4 of Figure 3.

A partially impregnated heel made in accordance with the teachings of the invention is illustrated in Figures 3 and 4. Numeral 1 designates the heel, 2 is the top-lift of rubber, leather, etc. secured to the heel by means of the conventional nails 3, and 4 is the shoe (shown in broken lines) to which the heel is attached by means of the conventional nails 5. As shown by the stippling the indurating compound impregnates both the top and bottom of the heel to the depth of the nails 3 and 5 but serves only as a superficial impregnation for the vertical sides.

From the foregoing description it can be seen that by departing from conventional methods of heel manufacture and resorting to a new technique, I have succeeded in devising a more suitable heel-making material than wood and a heel of a more satisfactory and uniform quality than has hitherto been made on a practical scale and have invented a method for fabricating heels which is not only more expeditious than conventional methods but is also susceptible of being practiced on a modern scale of mass production and lends itself so admirably to chemical and technical control that it is possible to produce a heel of substantially the same weight as a wood heel of the same size and style.

I claim:

1. A method of making shoe heels, which consists in providing a molded heel blank of fibrous paper-making material having substantially the shape and size of the final heel, subjecting the nail-holding portions of the blank to a bath of indurating agent of the type of molten sulphur, pitches and resins substantially to the depth to which the nails will extend, and subjecting the rest of the blank to a bath of said indurating agent until the blank is impregnated to a sufficient depth to impart to the blank sufficient rigidity and resistance to moisture.

2. A method of making shoe heels, which consists in selecting a paper-making pulp of relatively long fiber, diluting to a consistency of not more than 5%, molding a heel blank from said consistency, drying the blank, subjecting both the tops and bottoms of the blank to a bath of an indurating agent of the type of molten sulphur, pitches and resins, and subjecting the entire blank to a bath of said indurating agent until the blank is impregnated to a sufficient depth to impart to the blank sufficient rigidity and resistance to moisture.

3. A method of making shoe heels, which consists in selecting a paper-making pulp of relatively long fiber, diluting said pulp to a suitable molding consistency, molding a heel blank, drying the blank, and impregnating the blank with a hardening agent of the type of molten sulphur, pitches and resins.

4. A method of making shoe heels, which consists in selecting a paper-making pulp of relatively long fiber, processing said pulp to develop a self-adhesiveness sufficient to produce in the molded blank a strong fiber-to-fiber bond, diluting said pulp to a suitable molding consistency, molding a heel blank, drying the blank, and impregnating the blank with a hardening agent of the type of molten sulphur, pitches and resins.

5. A method of making shoe heels, which consists in processing a pulp of coniferous origin to a slowness of less than 7 minutes on the Brown sedimentation type tester scale, diluting said pulp to a suitable molding consistency, molding a heel blank, drying the blank, and impregnating the blank with a hardening agent of the type of molten sulphur, pitches and resins.

6. A method of making shoe heels, which consists in processing a pulp of coniferous origin to a slowness of less than 8 minutes and 55 on the Brown sedimentation type tester scale, mixing an infusible pore forming material with said pulp, diluting said pulp to a suitable molding consistency, molding a heel blank, drying the blank, and impregnating the blank with a hardening agent of the type of molten sulphur, pitches and resins.

7. A method of making shoe heels, which consists in processing a paper-making pulp to develop a self-adhesiveness sufficient to produce in the molded blank a strong fiber-to-fiber bond, mixing an infusible pore forming material therewith, diluting said pulp to a suitable molding consistency, molding a heel blank, drying the blank, and impregnating the blank with a hardening agent of the type of molten sulphur, pitches and resins.

8. A method of making shoe heels, which consists in selecting a paper-making pulp of relatively long fiber, processing said pulp to develop a self-adhesiveness sufficient to produce in the molded blank a strong fiber-to-fiber bond, mixing an infusible pore forming material therewith, diluting said pulp to a suitable molding consistency, molding a heel blank, drying the blank, and impregnating the blank with a hardening agent of the type of molten sulphur, pitches and resins.

9. A method of making shoe heels, which consists in processing a paper-making pulp to develop a self-adhesiveness in said pulp, forming a porous heel blank having a strong fiber-to-fiber bond from said pulp, said heel blank having substantially the shape and size of the final heel, and impregnating said porous heel blank with a hardening agent of the type of molten sulphur, pitches and resins to increase its rigidity and resistance to water.

10. A shoe heel adapted to be secured to a shoe by means of nails and adapted to have a top lift secured thereto by means of nails, said heel being molded from a paper-making pulp and being impregnated at the nail-holding portions with an indurating agent of the type of sulphur, pitches and resins, said heel having a substantially unimpregnated central portion.

11. A shoe heel molded from a paper-making pulp and being impregnated at its top, bottom and sides with an indurating agent of the type of sulphur, pitches and resins, said heel having a substantially unimpregnated central portion.

12. A shoe heel molded from a pulp of coniferous wood and being impregnated at its top, bottom and sides with an indurating agent of the type of sulphur, pitches and resins, said heel having a substantially unimpregnated central portion.

13. A shoe heel molded from a spruce sulphite pulp and being impregnated at its top, bottom and sides with an indurating agent of the type of sulphur, pitches and resins, said heel having a substantially unimpregnated central portion.

14. A method of making shoe heels, which consists in providing a molded heel blank composed of fibrous paper-making material and an infusible pore-forming material and having substantially the shape and size of the final heel, and impregnating the blank with a hardening agent of the type of molten sulphur, pitches and resins.

15. A method of making shoe heels, which consists in providing a molded unimpregnated heel blank of fibrous paper-making material, said blank being substantially porous and having a strong fiber-to-fiber bond, and impregnating said porous heel blank with a hardening agent of the type of molten sulphur, pitches and resins.

16. A shoe heel consisting of a blank of interfelted fibers of a paper-making pulp formed in situ from an aqueous defiberized suspension of said pulp, and impregnated with a hardening agent of the type of sulphur, pitches and resins to provide a heel characterized by increased imperviousness to moisture and improved nail-holding properties as compared to the unimpregnated blank.

HERMAN WILLIAM RICHTER.